De W. C. JOHNSON.
Chain-Propeller.
No. 159,330.
Patented Feb. 2, 1875.
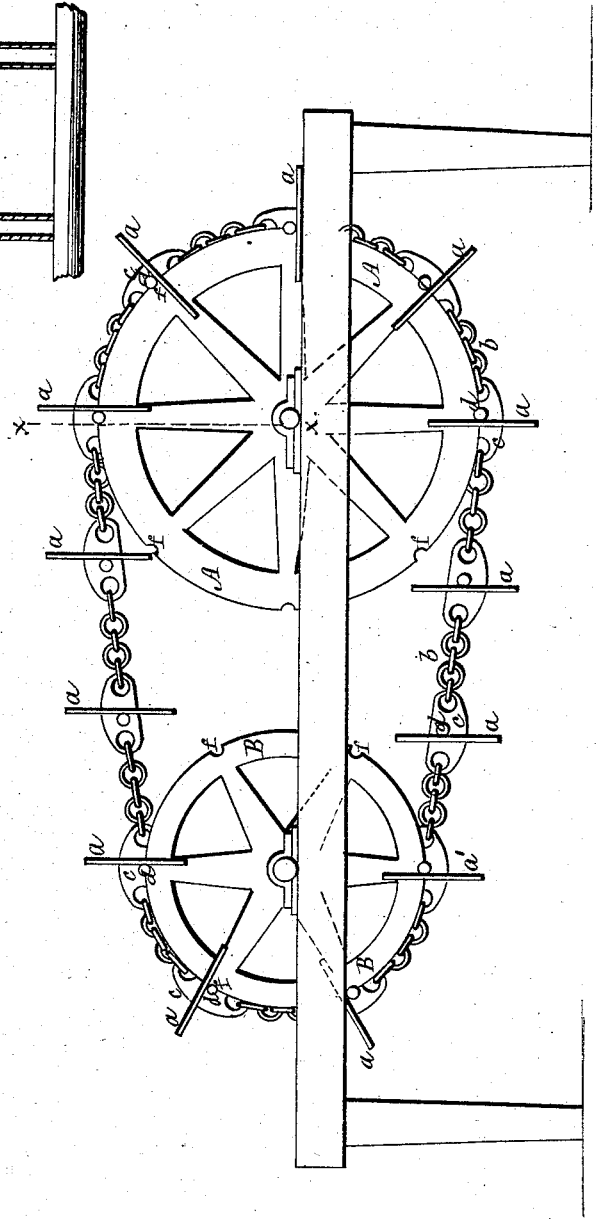
Witnesses:
D. R. Cowl
Edmund Masson
Inventor:
De Witt C. Johnson.
By atty. A. V. Stoughton.

UNITED STATES PATENT OFFICE.

DE WITT C. JOHNSON, OF REDDING, CALIFORNIA.

IMPROVEMENT IN CHAIN-PROPELLERS.

Specification forming part of Letters Patent No. 159,330, dated February 2, 1875; application filed January 12, 1875.

*To all whom it may concern:*

Be it known that I, DE WITT C. JOHNSON, of Redding, in the county of Shasta and State of California, have invented certain new and useful Improvements in Endless-Chain Propellers; and I do hereby declare the following to be a full, clear, and exact description of the same, reference being had to the accompanying drawings, making a part of this specification, in which—

Figure 1 represents a side elevation of the propeller. Fig. 2 represents a section taken through the line $xx$ of Fig. 1.

My invention relates to the link-plates forming part of the endless chain, to which plates the buckets are fastened centrally through the intervention of cross-shafts, in connection with the mechanism for applying and carrying such chains and buckets or paddles over and around a pair of chain-wheels of different diameters, so arranged that the buckets or paddles shall be raised up after they have ceased to propel, and be nearly or quite out of the water when, by their following the rear wheel, they would begin to "lift" the water, and so retard the vessel or boat.

To enable others skilled in the art to make and use my invention, I will proceed to describe the same with reference to the drawings.

The endless chains for carrying the buckets or paddles $a$ are composed of alternating links $b$ and link-plates $c$. The link-plates of the pair of chains opposite each other are connected together by a shaft, $d$, extending from chain to chain, and somewhat farther, and passing through the centers of the link-plates, to which they are fastened. The buckets or paddles $a$ extend somewhat beyond the chains, and are fastened centrally to the cross-shafts $d$, and said buckets or paddles are slotted at $e$, so as to straddle or take in the rims of the carrying-wheels A B, of which A is the forward and B the rearward wheel. The rims of the wheels A and B are grooved circumferentially, so that the link-plates $c$ may enter said grooves edgewise, and allow the cross-shafts $d$ to drop into the recesses $f$ in the perimeters of said wheels, and thus prevent the chains from slipping on said wheels, and force them to move with said wheels. The forward carrying-wheel, A, is of much larger diameter than the aft one, B, but the axes of both are in the same horizontal plane.

The chains and paddles, in passing back from the wheel A, are raised up gradually by the smaller wheel, B, so that the paddles dip less and less in the water as they pass backward, and by the time that the last working paddle—as, for instance, that at $a'$—is about to pass around the wheel B, it has been raised so high that it has little or no lifting action upon the water, which would retard the propulsion. The power to drive the endless chain of buckets or paddles is applied to the shaft of the front wheel, A, and these paddles are drawn through the water by the cross-shafts $d$ taking into the recesses $f$ of the wheels, and the paddles, too, are drawn by their centers instead of their edges, as is commonly the case.

Having thus fully described my invention, what I claim is—

The combination of the two chain-carrying wheels A B, of different diameters, but having their axes in the same horizontal plane, each wheel provided with groove and recesses in its perimeter, the endless chains provided with the link-plates $c$, and the slotted buckets or paddles $a$ centrally attached thereto, as and for the purpose described and represented.

DE WITT C. JOHNSON.

Witnesses:
RICHARD LAMBERT,
A. B. STOUGHTON.